Patented Feb. 6, 1951

2,540,869

UNITED STATES PATENT OFFICE 2,540,869

STABILIZATION OF CHLOROETHYL DICHLOROBENZENES

Edwin R. Erickson, Oak Park, Ill., assignor to Mathieson Chemical Corporation, a corporation of Virginia No Drawing. Application November 27, 1945, Serial No. 631,221

3 Claims. (Cl. 260—651)

This invention relates to a method of preventing or retarding the decomposition of halogen-containing organic compounds with production of hydrogen halides and encompasses compositions comprising halogenated organic compounds and the stabilizing agents employed in the practice of the method. In its most specific aspect the invention is concerned with preventing or retarding the dehydrochlorination of chloroethyl dichlorobenzenes. The invention provides a group of dehydrohalogenation inhibitors which are effective not only under the conditions encountered in the shipment and storage of halogenated organic compounds, but also in the relatively much higher temperatures obtaining during distillation operations.

Although my invention is applicable to the stabilization of halogenated organic compounds generally, it is particularly valuable as applied in the stabilization of halogenated organic compounds containing one or more halogen atoms on an alkyl side chain of an aromatic nucleus which itself may or may not be halogenated. Such compounds are especially susceptible to the loss of halogen in the form of halogen halide, the loss always occurring in greatest proportion from the side chain where both the nucleus and a side chain are halogenated, the rate of loss being chiefly a function of temperature.

Numerous materials have geen heretofore suggested for use as dehydrohalogenation inhibitors, particularly with respect to halogen-containing solvents such as those employed in the dry-cleaning art. Some of these appear to be effective at ordinary storage temperatures in compounds of the type just described, but few, if any, afford adequate protection at elevated temperatures. Protection at elevated temperatures is frequently of the greatest importance. Thus, in the distillation of chloroethyl dichlorobenzenes from admixture with higher boiling compounds, unless the distillation is carried out in the presence of an agent capable of preventing the dehydrochlorination of the chloroethyl groups at the temperature of the distillation, the resulting dichlorostyrenes will polymerize with the formation of polymers capable of plugging elements of the distillation equipment rendering them inoperative, and aside from this the loss of material as polymer is highly undesirable from an economic standpoint.

I have discovered that nitroso phenols and certain nitroso amines in small proportions effectively inhibit the dehydrohalogenation of halogenated organic compounds at elevated as well as at ordinary temperatures. The nitroso amines which are applicable are those derived from aromatic amines.

My inhibitors are essentially non-reactive with respect to organic halo-compounds and hydrogen halides, and they are effective not only in glass, but also in the presence of metals such as stainless steel and Monel, which are employed in the construction or fabrication of equipment used in handling, distillation, storage and shipment of organic chemicals. They may be most conveniently prepared by the action of nitrous acid on phenols and secondary and tertiary aromatic amines, but other methods may be used in preparing them. The secondary amines with nitrous acid usually yield N-nitroso compounds having the structure RN(NO)R', e. g. methyl phenyl nitrosoamine, nitrosodiphenylamine, and the like, while the tertiary amines usually yield ring nitroso compounds of the type $R_2NR'NO$ where R' is a bivalent aromatic nucleus such as phenylene. P - nitroso-dimethyl - aniline, p-nitrosodiethylaniline and the like represent examples of this latter type of nitroso compound. Exemplary of phenols which may be reacted with nitrous acid to produce nitroso phenols for use in the practice of my invention may be mentioned besides phenol itself: thymol, the cresols, the xylenols, the naphthols, and the halo-substituted phenols, such as o-chlorophenol, 2,5-dichlorophenol, etc.

Various substituent groups other than halogen may be present in the nitroso phenols and amines, including carboxyl, especially esterified carboxyl groups, e. g. methyl nitrososalicylate, acyl groups, e. g. nitrosohydroxyacetophenone, nitroacetanilide, etc., and alkoxyl groups, e. g. nitrosocatechol monomethyl ether, and the like.

It is not to be understood that the members of the class of inhibitors embraced by my invention are equivalent in the sense that each is equally suitable for a given application. Thus, the boiling point of a member may preclude its use in an application where other members are suitable. For example, in the distillation of a chloroalkyl benzene from a reaction mixture, the distillation being carried out using a single inhibitor, it is obviously essential that the inhibitor have substantially the same boiling point as the chloroalkyl benzene, for otherwise the inhibitor, depending upon whether it is lower or higher boiling than chloroalkyl benzene, will leave the distillation kettle before the chloroalkyl benzene, or will remain in the kettle throughout the distillation. In either event, the chloroalkyl benzene is unprotected as it proceeds upwardly of the distillation column. An inhibitor unsuitable for use in distillation may, of course, provide adequate protection during shipment or storage. Conversely, an inhibitor whose boiling characteristics are such that it may be used in a distillation operation may be entirely unsuited for the stabilization of the particular halogenated compound during storage because of insufficient solubility in the halogenated compound at ordinary storage temperatures.

My inhibitors may be used in combination as well as severally. For example in a continuous distillation operation in which a halogenated compound such as a chloroalkyl benzene or chloro-benzene is taken overhead, it is frequently advantageous to continuously add at the top of the distillation column an inhibitor which is relatively less volatile than the halogenated compound, while adding to the kettle an inhibitor which is relatively more volatile than the halogenated compound. This procedure gives maximum protection against dehydrohalogenation throughout the distillation system.

As hereinbefore stated, my inhibitors are effective in small proportions. Ordinarily, less than 1% on the weight of the halo compound is more than sufficient, but in certain cases it may be desirable to add more than 1%. A usually effective amount is about 0.1%, and this applies whether the protection is required for storage or shipment or during a distillation. A quantity as small as 0.01%, or even less, may be effective in some instances.

My invention is further illustrated by the following comparative examples, which are not to be taken as in any way limiting the scope thereof.

*Example 1*

In a blank test, a mixture of chloroethyl dichlorobenzenes having a refractive index of 1.5620 was placed in a tube surrounded by a constant temperature bath maintained at a temperature of about 213° C. The HCl evolved was swept from the tube with purified acid-free nitrogen and absorbed in a dilute standard alkali solution containing an indicator. The rate of decomposition of the sample was determined by periodic titrations. It was found to be 9.4 mol per cent per hour.

*Example 2*

In a second blank test conducted at 213–218° C., powdered Monel metal was present in the tube. This so greatly increased the rate of decomposition that it could not be accurately measured. The sample was totally decomposed in less than an hour, which means that the rate of decomposition was faster than 100 mol per cent per hour. The result was the same when stainless steel No. 347 was substituted for the Monel metal.

*Example 3*

To a mixture of chloroethyl dichlorobenzenes of the same composition as in Example 1 was added 0.1% by weight of alpha-nitroso-beta-naphthol. Upon test according to Example 1 (except that pure water containing an indicator was used in lieu of the alkali solution), the rate of decomposition was found to be only 0.76 mol per cent per hour.

*Example 4*

At 209° C. the rate of decomposition of the chloroethyl dichlorobenzenes inhibited with 0.1% of p-nitroso-dimethylaniline was only 0.52 mol per cent per hour.

*Example 5*

At 216–218° C. in the presence of Monel metal, the mixture of chloroethyl dichlorobenzenes containing 0.1% alpha-nitroso-beta-naphthol showed a decomposition rate of 4 mol per cent per hour. The decomposition rate was only 0.44 mol per cent per hour at 180° C.

*Example 6*

At 213–218° C. in the presence of No. 347 stainless steel, a mixture of chloroethyl dichlorobenzenes containing 0.1% alpha-nitroso-beta-naphthol showed a decomposition rate of 3.1 mol per cent per hour. At 180° C. the rate was only 0.37 mol per cent per hour.

*Example 7*

At 180° C. in the presence of copper powder, the mixture of chloroethyl dichlorobenzenes containing 0.1% of alpha-nitroso-beta-naphthol showed a decomposition rate of 3.5 mol per cent per hour. For comparative purposes, the test was repeated without the inhibitor. The evolution of HCl proceeded with explosive violence.

*Example 8*

In the presence of Raschig rings at 180° C., a mixture of chloroethyl dichlorobenzenes containing 0.1% alpha-nitroso-beta-naphthol showed a rate of decomposition of 0.34 mol per cent per hour. Without the inhibitor, the decomposition rate was 2.76 mol per cent per hour.

*Example 9*

In the presence of Monel metal and at a temperature of 150° C. a 75–25 mixture of chloroethyl dichlorobenzenes and dichlorostyrenes containing 0.1% of alpha-nitroso-beta-naphthol showed a decomposition rate of only 0.2 mol per cent per hour.

*Example 10*

In the presence of Monel metal at 180° C. the chloroethyl dichlorobenzenes containing 0.1% of methyl phenyl nitrosoamine showed a rate of decomposition of about 0.45 mol per cent per hour. In the presence of stainless steel, the rate was 0.43 mol per cent per hour.

*Example 11*

In the presence of Monel metal at 180° C., the mixture of chloroethyl dichlorobenzenes containing 0.1% of diphenyl nitrosoamine showed a decomposition rate of 0.49 mol per cent per hour.

*Example 12*

At 180° C. in the presence of Monel metal, the chloroethyl dichlorobenzenes containing 0.1% of p-nitroso phenol showed a decomposition rate of 0.34 mol per cent per hour.

*Example 13*

In the presence of stainless steel No. 347 at 180° C., the chloroethyl dichlorobenzenes containing 0.1% of nitroso thymol showed a rate of decomposition of only 0.2 mol per cent per hour.

*Example 14*

Under conditions similar to Examples 1 and 3, the chloroethyl dichlorobenzenes containing 0.1% of diphenylamine, a heretofore known dehydrohalogenation inhibitor, showed a rate of decomposition of 4.5 mol per cent per hour. This is to be compared with the rate of 0.76 mol per cent per hour obtaining in the case of alpha-nitroso-beta-naphthol.

Example 15

A solution of 0.05% of nitrosonaphthol and 0.05% of salicylal hydroxyethylethylene diamine in chloroethyldichlorobenzene was heated at 180° C. in the presence of Monel metal. The rate of evolution of hydrogen chloride was extremely low.

Example 16

At a temperature of 180° C. in the presence of stainless steel No. 347, the chloroethyldichlorobenzene containing 0.025% of salicylal-2,5-diamino toluene and 0.05% of nitroso thymol evolved only exceedingly small amounts of hydrogen chloride.

Example 17

0.1% by weight of alpha-nitroso-beta-naphthol was added to a sample of bromoethyl dichlorobenzene and the mixture heated at 180–181° C. The rate of hydrogen bromide evolution after 1 minute 30 seconds of heating was 0.117 mol per cent per minute. In the absence of the inhibitor, the rate of decomposition was about 2 mol per cent per minute.

Example 18

The rate of evolution of hydrogen bromide from bromoethyl dichlorobenzene containing 0.1% by weight of p-nitroso dimethyl aniline after heating for 3 minutes and 35 seconds at about 180° C. was only 0.0097 mol per cent per minute. After a total of 17 minutes 10 seconds at this temperature, the rate was 0.040 mol per cent per minute as compared with a rate of 10.03 mol per cent per minute from uninhibited bromoethyl dichlorobenzene heated at the same temperature for 16 minutes and 15 seconds.

Example 19

Hydrogen chloride was evolved from uninhibited pentachloroethane at 180° C. at a rate of 0.00405 mol per cent per minute. In the presence of 0.1% of p-nitrosodimethylaniline, the rate was 0.001910% per minute.

Example 20

In 11 minutes 20 seconds, uninhibited chloroethyldichlorobenzenes at 180° C. evolved sufficient hydrogen chloride to neutralize one ml. of 0.1004 N sodium hydroxide. A saturated solution (less than 0.1% by weight) of p-nitrosoaniline, prepared substantially as described in Beilstein, vol. 7, p. 625, required about 121 minutes to evolve the same amount of hydrogen chloride.

I claim:

1. The method of retarding the dehydrochlorination of chloroethyl dichlorobenzenes which comprises mixing a minor but effective proportion of a compound of the group consisting of alpha-nitroso-beta-naphthol, p-nitrosophenol, nitroso thymol, p-nitroso-aniline, p-nitroso-dimethylaniline, diphenyl nitrosoamine and methyl phenyl nitrosoamine.

2. The method of retarding the dehydrochlorination of chloroethyl dichlorobenzenes during a distillation operation which comprises effecting the distillation in the presence of a compound of the group consisting of alpha-nitroso-beta-naphthol, p-nitrosophenol, nitroso thymol, p-nitroso-aniline, p-nitroso-dimethylaniline, diphenyl nitrosoamine and methyl phenyl nitrosoamine.

3. As a composition of matter a mixture of chloroethyl dichlorobenzenes containing an amount of a compound of the group consisting of alpha-nitroso-beta-naphthol, p-nitrosophenol, nitroso thymol, p-nitroso-aniline, p-nitroso-dimethylaniline, diphenyl nitrosoamine and methyl phenyl nitrosoamine sufficient to retard its dehydrochlorination.

EDWIN R. ERICKSON.

REFERENCES CITED

The following references are of record in the file of this patent:

UNITED STATES PATENTS

| Number | Name | Date |
|---|---|---|
| 2,043,257 | Missbach | June 9, 1936 |
| 2,257,078 | Soday | Sept. 23, 1941 |
| 2,272,470 | Lincoln et al. | Feb. 10, 1942 |
| 2,338,297 | Mugdan | Jan. 4, 1944 |
| 2,361,538 | Franz | Oct. 31, 1944 |
| 2,391,685 | Egerton | Dec. 25, 1945 |